Patented May 14, 1946

2,400,446

UNITED STATES PATENT OFFICE 2,400,446

CATALYTIC TREATMENT OF HYDRO-
CARBON OILS

Preston L. Veltman, Beacon, N. Y., assignor, by mesne assignments, to The Texas Company, New York, N. Y., a corporation of Delaware No Drawing. Application February 18, 1941,
Serial No. 379,483

12 Claims. (Cl. 196—52)

This invention relates to the catalytic treatment of hydrocarbons, particularly petroleum hydrocarbons. The invention has particular application to the treatment of hydrocarbons to effect conversion of high molecular weight hydrocarbons into low molecular weight hydrocarbons for the production of hydrocarbons suitable for the manufacture of internal combustion motor fuel. In addition, it has application to the reforming of hydrocarbons such as the reforming of virgin and cracked naphtha hydrocarbons to improve their value as constituents of motor fuel.

In the catalytic cracking of oils to produce gasoline it has been the common practice to employ as catalysts such materials as fuller's earth, keiselguhr, activated clays, artificial zeolites, and synthetic compositions composed essentially of alumina and silica.

Ordinarily the oil to be cracked is heated and vaporized and the hot vapors are brought into contact with the solid catalyst under controlled conditions of temperature and pressure. The reaction products, including gas, gasoline hydrocarbons and higher boiling hydrocarbons, are separated in conventional ways. During the conversion coke-like material is deposited on the catalyst, reducing its activity and ability to catalyze the hydrocarbon conversion, and it becomes necessary to reactivate the catalyst. This is accomplished by burning off the coke with a stream of air or oxygen-containing gas. After thus reactivating the catalyst, it may be reused in cracking additional quantities of oil.

The present invention is based upon the discovery that compositions comprising a hydrated aluminum fluoride in combination with a catalytically active material, especially a catalytically active material that is porous in structure, constitute catalysts which are particularly valuable for use in the conversion of relatively high molecular weight hydrocarbons to low molecular weight hydrocarbons and for use in the reforming of virgin and cracked hydrocarbon distillates. In referring to a catalytically active material, it will be understood that materials which possess the ability to catalyze the reaction in question are intended.

It has been found that the properties of a wide variety of materials which have been proposed for use as cracking catalysts can be improved in one or more directions by combining the materials with a hydrated aluminum fluoride. It has also been found that the catalysts should be substantially free of sodium and potassium, these elements apparently acting to destroy the catalytic activity of the other ingredients, particularly at high temperatures. The catalysts of the invention, therefore, are substantially free of sodium and potassium and comprise a catalytically active material, which is preferably porous in structure, in combination or admixture with a hydrated aluminum fluoride. In general the catalysts contain a major proportion of the catalytically active material and a minor proportion of the hydrated aluminum fluoride. It has been found in many cases that a relatively small amount of the hydrated aluminum fluoride, for example, 1 per cent by weight or even less, is effective to improve the properties of the catalytic material.

While it is not intended that the invention should be limited to any theory of operation, it appears that the hydrated aluminum fluoride functions as an activator or promoter in the combined catalysts. The results obtained cannot be explained on the basis of the mere additive effects of the ingredients since by replacing a small portion of a catalytically active material with a hydrated aluminum fluoride marked improvement in the catalytic action of the material has been obtained.

The catalysts are designed for use at elevated temperatures—catalytic cracking and reforming are preferably carried out at temperatures above 700° F.—and are substantially stable and non-volatile at temperatures at least up to about 1200° F. The particular hydrate of aluminum fluoride that is present in the completed catalyst will depend in many cases upon the temperature to which the catalyst is heated before and during use, and the duration of the heating. Aluminum fluoride in the form of the hemi-hydrate, $AlF_3.\tfrac{1}{2}H_2O$, is stable at temperatures up to 1200° F. It is known to exist as the mono-hydrate, $AlF_3.1H_2O$, at temperatures up to about 500° F., and may exist, at least partly, in this higher hydrate form at higher temperatures, particularly when associated with a catalytically active material as in the catalysts of the invention. Accordingly, when the catalysts are made up by combining a hydrated aluminum fluoride, as such, with a catalytically active material, it is preferred to employ the hemi-hydrate, and it is believed that when forming the fluoride in situ, as is done in many cases, or when using a higher hydrate, in the final catalyst the aluminum fluoride may be in the form of the hemi-hydrate to a large extent.

A preferred form of catalyst, which has been found to be particularly effective as a cracking catalyst, comprises solid hydrated aluminum fluoride associated with a catalytically active solid adsorbent material, either natural or artificial. Such adsorbent materials include silicious materials, such as fuller's earth, activated clays, aluminum silicates, etc., as well as non-silicious materials, such as alumina and magnesia.

Other adsorbent materials may be used upon which the fluoride may be adsorbed or dispersed. While adsorbent materials have been mentioned specifically, it is, nevertheless, contemplated that the material with which the aluminum fluoride is associated may comprise other finely divided or pulverulent solid materials.

The invention thus contemplates a composite or mixed catalyst consisting of hydrated aluminum fluoride, and particularly the hemi-hydrate, in combination with a secondary material or support which is catalytically active. Stated in another way, it may be defined as a composite catalyst consisting of solid catalytically active adsorbent material having the fluoride associated with the adsorbent material in a stable substantially non-volatile form. The catalyst is thought to be particularly effective when in a porous non-fused form.

The catalysts of the invention are especially valuable for use in the vapor phase cracking of hydrocarbons, especially petroleum hydrocarbons. In this operation the hydrocarbon vapors are passed in momentary contact with a solid catalyst which may be in the form of pieces or lumps but is preferably in the form of pellets. The temperature may be maintained from 700° F. upwards, for example, the temperature may vary from 700° F. to 1100° F. although it is generally regarded as preferable to operate at temperatures within the range of 800° to 1000° F. Various pressures may be maintained during this operation; for example, pressures from atmospheric to about 100 to 300 pounds per square inch or higher.

The specific manner in which the catalysts are prepared will depend to a considerable extent upon the catalytically active material used in the preparation. Since it is ordinarily difficult to make up the catalysts in the form of lumps or pellets, the components are usually mixed with a binding agent which is preferably an organic compound or mixture of compounds. When the catalysts are to be employed in a process of the general nature of that outlined above, prior to use they are preferably calcined at an elevated temperature; for example, they are heated at a temperature of about 1000° F. for from six to eight hours. The calcining is effective to remove the binding agent and also appears to produce another important result. It has been found to be important in preparing the catalysts to have present in the mixture or dispersion a substantial proportion of free and/or combined water. A large part of this water is removed during calcining and it is believed this removal of water causes a desirable change in the physical nature of the catalyst.

The following are examples of specific catalysts which have been found effective:

1. Magnesium fluoride-silica-aluminum fluoride catalyst in which the magnesium fluoride amounts to about 2% and the aluminum fluoride, in the form of the hemi-hydrate, amounts to about 6% by weight. This material was prepared by precipitating the magnesium fluoride in the presence of silica gel, finely-divided aluminum fluoride hydrate being added to the mixture prior to precipitation of the magnesium fluoride.

2. Aluminum fluoride-magnesia catalyst, containing about 20% $AlF_3$ hemi-hydrate, prepared by forming a slurry of commercial magnesia and treating the slurry with solutions of aluminum chloride and ammonium fluoride.

3. Super Filtrol-aluminum fluoride hemi-hydrate comprising a physical mixture containing about 10% by weight of the fluoride ground to around 40 to 50 mesh.

In each case the catalysts after drying, pelleting and calcining by heating at a temperature of around 1000° F. for from 6 to 8 hours were tested as cracking catalysts in the cracking of virgin gas oil to produce gasoline. The tests demonstrated that these particular catalysts were effective in producing a high yield of gasoline with low yields of gas and carbon.

Catalyst 1, for example, was compared with a standard catalyst, which will be subsequently referred to as Catalyst "A," and which is a silica-alumina type of catalyst containing a high ratio of silica to alumina. According to this comparison, at a cracking temperature of about 1000° F., the fluoride catalyst gave a substantially higher yield of gasoline than the standard catalyst. In addition, the yields of gas and carbon were substantially lower than were those obtained with the standard catalyst.

The preparation of two catalysts, namely Catalyst "B," consisting of a compound containing about 80% $SiO_2$, 15% $MgF_2$, and 5% $AlF_3 \cdot \frac{1}{2}H_2O$, and Catalyst "C" comprising the above-mentioned standard Catalyst "A" containing about 10% aluminum fluoride hemi-hydrate will now be described more specifically.

*Catalyst "B"*

A batch of sodium-free hydrated silica was prepared by neutralizing a dilute solution of sodium silicate with dilute hydrochloric acid, filtering and washing free of sodium in the wet state. 4,830 grams of this silica gel, containing approximately 400 grams of $SiO_2$, were slurried with 10 liters of water until a uniform dispersion resulted. A finely ground mixture containing 90 grams of ammonium fluoride and 30 grams of $AlF_3 \cdot \frac{1}{2}H_2O$, was added to the slurry while stirring, the stirring being continued for about 20 minutes.

This slurry was then treated with about 2 liters of an aqueous solution of magnesium chloride containing about 7% by weight of $MgCl_2$, and stirring continued for about one hour.

The pH was then adjusted to about seven with dilute hydrochloric acid and ammonium hydrate solutions. The resulting precipitate was removed by filtration and washed once by slurrying with water and filtering. The washed precipitate was dried to about 20% water content at 250° F. and pelleted. The pellets were calcined at about 1000° F. for six hours.

*Catalyst "C"*

A batch of the previously mentioned standard Catalyst "A," in the form of pills, was moistened with aluminum chloride solution. The moistened pills were heated at about 200° F. for about three hours so as to remove approximately one-half of the water added with the aluminum chloride solution. Thereafter the pills were cooled to room temperature. The cooled pills were then moistened with an aqueous solution of ammonium fluoride. These pills were then maintained at a temperature of around 212° F. until dry. Following this they were calcined by heating at 1000° F. for four hours.

The aluminum chloride and ammonium fluoride solutions used were of sufficient concentration to produce a final product containing 10% by weight of aluminum fluoride.

Many of the more important catalysts for use in accordance with the invention contain silica and alumina. Catalysts of this type are preferably prepared by using as a base a hydrated silica gel free from sodium and potassium, and preferably other alkali metals, and incorporating in the gel the hydrated aluminum fluoride and other materials to be used. The resulting mixture or dispersion is then heated to remove water to produce a relatively dry product which, however, will contain a substantial proportion of free or combined water. The product is then preferably mixed with a small proportion of a binding agent and is calcined to remove this agent and a part of the water. In making up a catalyst of this class it is preferred to make up the aluminum fluoride by reaction between another aluminum salt, such as aluminum chloride, and a fluoride of a weak base, such as ammonium fluoride, or hydrofluoric acid. These catalysts preferably contain a major proportion of silica and may contain other materials in addition to the three named. For example, valuable catalysts of this class contain a proportion of zirconia.

As a feature of the invention it has been found that especially valuable catalysts may be prepared to contain silica, alumina, a hydrated aluminum fluoride, and magnesia or magnesium fluoride. These catalysts may be prepared, for example, by mixing an aluminum oxide-magnesium oxide gel with hydrofluoric acid or with a salt of a weak base with hydrofluoric acid, such as ammonium fluoride, in the presence of water to produce a slurry containing aluminum fluoride, alumina, magnesium fluoride and magnesia, and then mixing this slurry with a relatively large proportion of a hydrated silica gel free of sodium and potassium. Similar catalysts may be prepared by mixing an aluminum oxide gel with hydrofluoric acid or ammonium fluoride and with magnesia to produce a combination slurry suitable for addition to the hydrated silica gel.

A slurry for mixture with silica gel and having properties for catalyst preparation similar to the properties of the slurries described above may be prepared by reacting ammonium fluoride or hydrofluoric acid with a soluble aluminum salt, such as aluminum chloride, in the presence of water, neutralizing, and then adding magnesia. In this case the mixing of aluminum chloride with ammonium fluoride or hydrofluoric acid produces a hydrated aluminum fluoride and on neutralizing the acidity some alumina is formed. Whether the magnesia is converted to magnesium fluoride has not been established and it may be that the magnesia remains as such in the final catalyst.

On mixing a slurry prepared by any of the above procedures with the silica gel a combination slurry is obtained which is preferably dried to reduce the water content to the desired amount, preferably of the order of 20 per cent, mixed with an organic binding agent and calcined.

A catalyst of this class may also be prepared by mixing a hydrated aluminum fluoride and magnesium fluoride with a hydrated silica-alumina gel. The resulting slurry, after reducing the water content, may be treated as above described to produce a finished catalyst.

The catalysts comprising silica, alumina, a magnesium compound, and aluminum fluoride consisting of 100 parts by weight preferably contain these materials according to analysis in the following proportions: 50 to 95 parts by weight silica, 1 to 20 parts by weight alumina, 1 to 20 parts by weight magnesia, and 1 to 20 parts by weight aluminum fluoride, considered as the anhydrous salt. Catalysts which are especially preferred are those which contain in 100 parts by weight 80 to 93 parts of silica, 1 to 10 parts of alumina, 3 to 7 parts of aluminum fluoride, and 1 to 4 parts of magnesia. As previously indicated, the aluminum fluoride is present in the hydrated form, probably the hemi-hydrate, and the magnesium, which is considered as being present as the oxide, may or may not be present in part at least in the form of the fluoride.

In order that the invention may be understood more fully the following additional examples which illustrate processes for preparing suitable catalysts are given:

*Example I*

A substantially sodium-free hydrated silica gel was prepared from an aqueous solution containing 1650 grams of sodium silicate by treatment with hydrochloric acid and finally adding ammonium hydroxide until the resulting slurry was just acid to litmus. The gel was then filtered, washed with three liters of water, and then with three liters of water containing five cubic centimeters of concentrated hydrochloric acid.

To complete the washing the gel was slurried with an aqueous solution containing 100 grams of $AlCl_3.6H_2O$ in three liters of water, and finally the gel was washed with three liters of water with one-half hour of stirring. This thorough washing was effective substantially to remove sodium from the gel. 395 cubic centimeters of dilute ammonium hydroxide were added to a solution containing 199 grams $AlCl_3.6H_2O$ in two liters of water, this making the system just basic to litmus and causing the precipitation of a gel. The gel was removed by filtration and washed thoroughly with water. This hydrated alumina was slurried with two liters of water and an aqueous solution containing 40.4 grams of ammonium fluoride was added. 10.4 grams of magnesia were then dispersed in the system. The system was then combined with the silica gel, which contained about 90 per cent water, and the resulting mixture was stirred until a smooth slurry was obtained. After standing the product was filtered and the filter cake was dried at 250° F. to reduce the water content. The dried material was ground to 40 mesh, mixed with 4 per cent flour and 2 per cent stearic acid and formed into cylindrical pellets $\frac{3}{32}$ inch in diameter and ⅛ inch in height. The pellets were calcined for six hours at 1000° F. A portion of the resulting catalyst was ignited from 1000° F. to 1800° F. to provide an indication of the water content. Another portion of the catalyst was analyzed. This analysis showed the following: 92.8 per cent $SiO_2$, 0.7 per cent $Al_2O_3$, 3.5 per cent $AlF_3$, and 3.4 per cent MgO. The loss of weight on ignition to 1800° F. was 2.4 per cent. It will be understood that in grouping the elements in the above manner it is not intended to indicate that the elements are necessarily combined as indicated. For example, it may be that a portion of the fluorine is combined with magnesium in the form of magnesium fluoride. Also the aluminum fluoride is undoubtedly in the hydrated form.

Example II

The catalyst of this example was prepared in a somewhat similar manner to that described in Example I. However, a slurry containing aluminum fluoride and magnesium was prepared by mixing an aqueous solution containing 40.4 grams of ammonium fluoride in one liter of water with an aqueous solution containing 144 grams of $AlCl_3.6H_2O$ in five liters of water. After stirring, dilute ammonium hydroxide was added to make the solution neutral to litmus and 10.4 grams of MgO were mixed in. A combined slurry was prepared by mixing this slurry with an amount of sodium-free silica gel (containing about 90 per cent water) corresponding to about 425 grams of dry silica. The combined slurry was permitted to stand, a layer of supernatant liquid was drawn off, and the remaining product was filtered and dried to reduce the water content to 20 per cent, which is regarded as being an especially desirable procedure. The catalyst was finished in the manner described in Example I. The analysis showed 89 per cent $SiO_2$, 2 per cent $Al_2O_3$, 3 per cent $AlF_3$ and 1 per cent MgO, and the loss on ignition from 1000° to 1800° F. was 3 per cent.

Example III

An aqueous solution containing about 340 grams of ammonium fluoride in one liter of water was added to an aqueous solution containing about 556 grams of $AlCl_3.6H_2O$ and about 163 grams of $MgCl_2.6H_2O$ in one liter of water. The resulting solution was evaporated to dryness and then heated at 1000° F. to drive off ammonium chloride and form about 250 grams of a mixture of aluminum fluoride and magnesium fluoride.

5,447 grams of hydrated silica gel prepared in a manner similar to that described in Example I and containing 430 grams of $SiO_2$ on a dry basis was mixed with a solution containing about 22 grams of $AlCl_3.6H_2O$ in six liters of water. 150 cc. of dilute ammonium hydroxide was added to the resulting solution, this making the solution basic to litmus. The resulting silica-alumina gel was filtered from the remainder of the solution and washed thoroughly with water.

About 44 grams of the mixture of aluminum fluoride and magnesium fluoride prepared as described above were slurried in six liters of water and the slurry was mixed with the combination silica-alumina gel. After stirring thoroughly, the system was filtered and the filter cake was dried for about twenty hours at 250° F. to reduce the moisture content to about 24 per cent. The dry composition obtained was ground to 40 mesh and further treated as described in Example I.

Example IV 29 grams of $MgCO_3$ and 50 cc. of dilute hydrochloric acid were added to a solution containing 195 grams of $AlCl_3.6H_2O$ in five liters of water. Dilute ammonium hydroxide was then added until the solution was just basic to litmus, thereby forming alumina and magnesia. After stirring, a solution containing about 50 grams of 48 per cent hydrofluoric acid in 500 cc. of water was added to the system. The resulting mixture, which contained a precipitate comprising aluminum fluoride and magnesium fluoride, after stirring was neutral to litmus. The precipitate was filtered from the solution and washed thoroughly with water. The washed precipitate was slurried in six liters of water and a quantity of hydrated silica gel prepared in a manner similar to that described in Example I sufficient to contain 438 grams of dry $SiO_2$ was mixed with the slurry. After stirring, the system was filtered and the combination gel obtained was dried at 250° F. to a 21 per cent moisture content. The relatively dry gel was ground to 40 mesh and finished as described in Example I.

Example V

A hydrated aluminum fluoride was prepared by evaporating a solution containing 287 grams of aluminum chloride and 132 grams of ammonium fluoride in two liters of water, until the water content was reduced to that corresponding to the hemi-hydrate. 57 grams of this hydrated aluminum fluoride were mixed intimately with 240 grams of an acid treated bentonite clay marketed under the trade name Super Filtrol. The resulting mixture was mixed with 4 per cent flour and 2 per cent stearic acid, pelleted and calcined at 950° F. for five hours. Analysis indicated that the catalyst contained 53.3 per cent $SiO_2$, 18.5 per cent $Al_2O_3$ and 19.2 per cent $AlF_3$. The loss on ignition from 1000° to 1800° F. was 14 per cent indicating that the catalyst contained a substantial proportion of water, and that some decomposition occurred at this elevated temperature.

Example VI

A catalyst was prepared in the same manner as described in Example V, but using 20 grams of the hydrated aluminum fluoride and about 180 grams of Super Filtrol. Analysis indicated that the final catalyst contained 8.9 per cent $AlF_3$.

Example VII

An amount of sodium-free silica gel prepared in a manner similar to that described in Example I corresponding to 400 grams of dry silica was mixed with 100 grams of hydrated aluminum fluoride ($AlF_3.xH_2O$) and ground until the materials were intimately mixed. The catalyst was dried at 250° F. to 11.1 per cent moisture content and finished as described in Example I. Analysis of the catalyst indicated the following: 85 per cent $SiO_2$, 4.9 per cent $Al_2O_3$ and 10.4 per cent $AlF_3$. The loss on ignition from 1000° to 1800° F. was 7.9 per cent.

Example VIII 100 grams of hydrated aluminum fluoride ($AlF_3.xH_2O$) were heated to 1000° F. for two hours, ground to 100 mesh, and slurried in three liters of water. To this slurry was added a solution of 236 grams of $AlCl_3.6H_2O$ dissolved in two liters of water. After stirring for twenty minutes, 500 cc. of dilute ammonium hydroxide were added to make the slurry just basic to litmus. The system was allowed to stand, filtered, and the filter cake was washed with water. The resulting aluminum fluoride-alumina gel was slurried in three liters of water and this slurry was mixed with a slurry containing in three liters of water a silica gel prepared in a manner similar to that described in Example I from 1230 grams of sodium silicate. The mixture was stirred for twenty minutes and filtered. The resulting product was dried at 250° F. to a 20 per cent moisture content, ground to 40 mesh, mixed with 4 per cent flour and 2 per cent stearic acid pelleted and calcined at 1000 F. Analysis showed the catalyst to contain 58.3 per cent $SiO_2$, 24.6 per cent $Al_2O_3$, and 12.9 per cent $AlF_3$.

Example IX

The catalyst of this example contained a product resulting from the reaction of hydrated aluminum fluoride with aluminum powder at an elevated temperature. This product was prepared by mixing 186 parts by weight of the aluminum fluoride with 27 parts by weight of aluminum powder and heating the resulting mixture to 1000° F. in the presence of air. A vigorous reaction resulted. The resulting product was then heated at 350 F. for two hours and ground to 100 mesh.

A slurry was made up by adding a hydrated silica gel prepared from 1400 grams of sodium silicate in a manner similar to that described in Example I to a solution of 236 grams of $AlCl_3.6H_2O$ and 54.3 grams of $ZrO(NO_3)_2.2H_2O$ dissolved in five liters of water. The system was stirred until a smooth slurry resulted and then after standing 540 cc. of dilute ammonium hydroxide were added to make the slurry just basic to litmus. The precipitate was filtered from the solution and washed with water. To this slurry 50 grams of the aluminum fluoride-alumina reaction product were added and the resulting mixture was stirred for one hour and filtered. The product obtained as a result of this procedure was dried at 250° F. to a 15 per cent moisture content and finished as described in Example I. Analysis showed the catalyst to contain 69.7 per cent $SiO_2$, 14.6 per cent $Al_2O_3$, 9.7 per cent $ZrO_2$, and 4.9 per cent $AlF_3$.

Example X

A silica gel was prepared from 1640 grams of sodium silicate in a manner similar to that described in Example I except that final washing with water was omitted. The silica gel was added to a solution containing 180 grams of $AlCl_3.6H_2O$ and 87 grams of $Zr(NO_3)_4.5H_2O$ in five liters of water. After permitting the system to stand 550 cc. of dilute ammonium hydroxide were added until the solution was just basic to litmus. The precipitate was filtered from the solution and washed by slurrying in three liters of water containing three cc. of concentrated ammonium hydroxide. The washed filter cake was slurried in a solution containing 31 grams of $NH_4HF_2$ in four liters of water. After stirring the mixture and allowing it to stand, sufficient dilute ammonium hydroxide was added to make the solution just basic to litmus. The mixture was stirred for one hour and filtered and the filter cake was dried at 250° F. to an 11 per cent moisture content and finished as described in Example I.

The catalysts described in the foregoing examples are particularly adapted for use in the vapor phase catalytic cracking of petroleum hydrocarbons to produce gasoline hydrocarbons. The following examples give the results obtained by some of the catalysts in this type of operation. In these examples a virgin gas oil having an end boiling point of 700° F. and derived as a distillate from East Texas crude was employed. The vaporized gas oil heated to about 900° F. was charged continuously to a tower packed with the catalyst in pelleted form, at a space velocity of 2.2 (400 cc. of gas oil per hour per 180 cc. of catalyst). The tower was maintained at a temperature of about 900° F. and under atmospheric pressure. The liquid product obtained during the intervals of time indicated was separately accumulated and analyzed to determine the content of debutanized gasoline having an end boiling point of 400° F. Also the gaseous products were collected and analyzed to determine their constitution.

Example XI

The catalyst described in Example I was used for the cracking of gas oil in the manner outlined above. After a two-hour period, it was found that the yield of gasoline (volume per cent, basis charge) was 33.4 per cent and that the octane value of the gasoline (C. F. R. M. method) was 79.9. Also, the carbon deposited was determined and it was found that the ratio between the gallons of gasoline obtained and the pounds of carbon was 5.3. The gas production was 5.1 per cent by weight of the charge and analysis of the gas showed that it contained 14.4 per cent by volume hydrogen.

In a run carried out under the same conditions but using a standard catalyst containing silica, alumina, and zirconia, which is regarded as being an especially valuable catalyst, the yield and octane value of the gasoline were substantially the same as obtained with the above catalyst but the gasoline-carbon ratio was only 3.1. Also, 10.1 per cent by weight gas was produced and this gas contained 21.8 per cent by volume hydrogen.

Example XII

The catalyst described in Example V was used for the cracking of gas oil in the manner outlined above. After a four hour period, it was found that the yield of gasoline was 30.8 per cent and that the octane value of the gasoline (C. F. R. M. method) was 80.3.

A catalyst, similar to that of Example V except that aluminum fluoride was not added, which catalyst was prepared by pelleting a mixture of 94 per cent by weight Super Filtrol and 6 per cent aluminum stearate, and calcining for eight hours at 1050° F., gave a yield of gasoline of 19.3 per cent under substantially the same conditions. Thus, the addition of the hydrated aluminum fluoride materially increased the yield of gasoline.

It will be understood that the above two examples of the use of the catalysts of the invention are merely representative and that other catalysts of the class defined above, particularly those specifically disclosed, may be used in place of the catalysts employed in these examples to produce equivalent results. The advantages flowing from the use of a hydrated aluminum fluoride with a catalytically active material will vary depending upon the characteristics of the material. In general, where the catalytically active material is deficient in producing high yields, the addition of the fluoride produces a catalyst capable of giving higher yields. In other cases, the hydrated aluminum fluoride acts to improve the type of gas produced in the catalytic reaction, to reduce the amount of gas produced, or to reduce the amount of carbon deposited in relation to the amount of gasoline produced.

While vapor phase cracking has been described above, it is contemplated that the catalysts of this invention may be employed in liquid phase cracking. The characteristic of low carbon deposition with these catalysts, even at low temperatures; i. e., 700° to 750° F., and therefore in the presence of liquid hydrocarbons, indicates their suitability for cracking under substantial pressures.

It is contemplated that the powdered form of the catalyst is particularly applicable to a cracking system wherein the catalyst is passed continuously through the reaction zone.

When the catalysts are used as solid particles or pellets and the hydrocarbons to be treated are passed through a body of solid catalyst, various space velocities may be selected. In general, dependent upon the temperature and pressure maintained and other conditions of operation, the space velocity will vary from about 1 to 10.

As appears from the examples, the proportion of hydrated aluminum fluoride in the catalysts may be varied. The catalysts preferably contain from 1 to 20 per cent aluminum fluoride, considered as the anhydrous salt.

It is an object of the invention to use a solid type of catalyst containing the fluoride in an active form and in a form which is stable and substantially non-volatile at temperatures up to about 1200° F. It may be employed in pellet, pill or powdered form.

It will thus be seen that the invention provides an improved process for the catalytic cracking of relatively high molecular weight hydrocarbons, particularly petroleum oils which boil above the gasoline range, involving the use of improved catalysts. The invention also provides novel catalysts which are of particular value for use in catalytic cracking but may also be used, for example, in the reforming of virgin and cracked hydrocarbon distillates.

This application is a continuation-in-part of my application, Serial No. 311,943, filed December 30, 1939.

Since changes may be made in the products and processes described above without departing from the scope of the invention, it is intended that the description shall be taken as illustrative and not in a limiting sense.

I claim:

1. In thermal conversion reactions selected from the group consisting of catalytic cracking and reforming hydrocarbons to produce high octane gasoline hydrocarbons, the method which comprises bringing said first-mentioned hydrocarbons at conversion temperatures into brief, intimate contact with a solid catalyst substantially stable and non-volatile at elevated temperatures below about 1200° F., which is substantially free of sodium and potassium and comprises aluminum fluoride hemi-hydrate in association with an adsorbent material such that there is substantial conversion of feed hydrocarbons into said high octane gasoline hydrocarbons.

2. In thermal conversion reactions selected from the group consisting of catalytic cracking and reforming hydrocarbons to produce high octane gasoline hydrocarbons, the method which comprises bringing said first-mentioned hydrocarbons at conversion temperatures above 700° F. into brief, intimate contact with a solid catalyst substantially stable and non-volatile at elevated temperatures below about 1200° F., which is substantially free of sodium and potassium and comprises aluminum fluoride hemi-hydrate in association with a silicious arsorbent material such that there is substantial conversion of feed hydrocarbons into said high octane gasoline hydrocarbons.

3. In thermal conversion reactions selected from the group consisting of catalytic cracking and reforming hydrocarbons to produce high octane gasoline hydrocarbons, the method which comprises bringing said first-mentioned hydrocarbons at conversion temperatures above 700° F. into brief, intimate contact with a solid catalyst substantially stable and non-volatile at elevated temperatures below about 1200° F., which is substantially free of sodium and potassium and comprises aluminum fluoride hemi-hydrate in association with an active combination of silica and alumina such that there is substantial conversion of feed hydrocarbons into said high octane gasoline hydrocarbons.

4. In thermal conversion reactions selected from the group consisting of catalytic cracking and reforming hydrocarbons to produce high octane gasoline hydrocarbons, the method which comprises bringing said first-mentioned hydrocarbons in the vapor phase at conversion temperatures above 700° F. into brief, intimate contact with a solid catalyst substantially stable and non-volatile at elevated temperatures below about 1200° F., which is substantially free of sodium and potassium and comprises a major proportion of silica and a minor proportion of aluminum fluoride hemi-hydrate.

5. In thermal conversion reactions selected from the group consisting of catalytic cracking and reforming hydrocarbons to produce high octane gasoline hydrocarbons, the method which comprises bringing said first-mentioned hydrocarbons in the vapor phase at conversion temperatures above 700° F. and at a pressure from about atmospheric to 300 pounds per square inch into brief, intimate contact with a solid catalyst substantially stable and non-volatile at elevated temperatures below about 1200° F., which is substantially free of sodium and potassium and comprises a major proportion of a silicious adsorbent material and a minor proportion of aluminum fluoride hemi-hydrate.

6. In thermal conversion reactions selected from the group consisting of catalytic cracking and reforming hydrocarbons to produce high octane gasoline hydrocarbons, the method which comprises bringing said first-mentioned hydrocarbons at conversion temperatures above 700° F. into brief, intimate contact with a solid catalyst which is substantially free of sodium and potassium and comprises a major proportion of silica and a minor proportion each of a hydrated aluminum fluoride and a magnesium compound selected from the group consisting of magnesia and magnesium fluoride.

7. In thermal conversion reactions selected from the group consisting of catalytic cracking and reforming hydrocarbons to produce high octane gasoline hydrocarbons, the method which comprises bringing said first-mentioned hydrocarbons at conversion temperatures into brief, intimate contact with a solid catalyst which is substantially free of sodium and potassium and comprises in combination silica, alumina, aluminum fluoride and a magnesium compound selected from the group consisting of magnesia and magnesium fluoride, the silica comprising a major proportion of the catalyst and the aluminum fluoride being in hydrated form and being dispersed throughout the catalyst.

8. In thermal conversion reactions selected from the group consisting of catalytic cracking and reforming hydrocarbons to produce high octane gasoline hydrocarbons, the method which comprises bringing said first-mentioned hydrocarbons in the vapor phase at conversion temperatures above 700° F. and at a pressure from about atmospheric to 300 pounds per square inch into brief, intimate contact with a solid catalyst which is substantially free of sodium and potassium and comprises in combination silica, alumina, aluminum fluoride and a magnesium compound selected from the group consisting of magnesia and magnesium fluoride, the silica comprising a major proportion of the catalyst and the aluminum fluoride being in hydrated form and being dispersed throughout the catalyst.

9. In thermal conversion reactions selected from the group consisting of catalytic cracking and reforming hydrocarbons to produce high octane gasoline hydrocarbons, the method which comprises bringing said first-mentioned hydrocarbons at conversion temperatures into brief, intimate contact with a solid catalyst which is substantially free of sodium and potassium and comprises a major proportion of silica in combination with alumina, zirconia, and a hydrated aluminum fluoride.

10. In thermal conversion reactions selected from the group consisting of catalytic cracking and reforming hydrocarbons to produce high octane gasoline hydrocarbons, the method which comprises bringing said first-mentioned hydrocarbons at conversion temperatures into brief, intimate contact with a solid catalyst substantially stable and non-volatile at elevated temperatures below about 1200° F., which is substantially free of sodium and potassium and comprises a major proportion of an active acid-treated bentonite clay and a minor proportion of aluminum fluoride hemi-hydrate.

11. The process for cracking high molecular weight petroleum hydrocarbons to produce gasoline hydrocarbons which comprises bringing said high molecular weight petroleum hydrocarbons at cracking temperatures into brief, intimate contact with a catalyst which is substantially free of sodium and potassium and comprises in combination silica, alumina, aluminum fluoride, and a compound selected from the group consisting of magnesia and magnesium fluoride, the silica comprising a major proportion of the catalyst and the aluminum fluoride being in hydrated form and being dispersed throughout the catalyst.

12. The process of cracking high molecular weight petroleum hydrocarbons to produce high octane gasoline hydrocarbons which comprises bringing said high molecular weight petroleum hydrocarbons in the vapor phase at conversion temperatures above 700° F. and at a pressure from about atmospheric to 300 pounds per square inch into brief, intimate contact with a solid catalyst which is substantially free of sodium and potassium and comprises in combination silica, alumina, aluminum fluoride and a magnesium compound selected from the group consisting of magnesia and magnesium fluoride, one hundred parts by weight of said catalyst containing by analysis 50 to 95 parts by weight silica, 1 to 20 parts by weight alumina, 1 to 20 parts by weight aluminum fluoride, and 1 to 20 parts by weight magnesia, the aluminum fluoride being in hydrated form and being dispersed throughout the catalyst.

PRESTON L. VELTMAN.